United States Patent
Letwin et al.

(10) Patent No.: US 11,294,371 B2
(45) Date of Patent: Apr. 5, 2022

(54) AUTONOMOUS VEHICLE WITH INDEPENDENT AUXILIARY CONTROL UNITS

(71) Applicant: UATC, LLC, San Francisco, CA (US)

(72) Inventors: Nicholas Letwin, Pittsburgh, PA (US); Sean Kelly, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 599 days.

(21) Appl. No.: 16/031,188

(22) Filed: Jul. 10, 2018

(65) Prior Publication Data

US 2018/0321677 A1 Nov. 8, 2018

Related U.S. Application Data

(63) Continuation of application No. 15/279,165, filed on Sep. 28, 2016, now Pat. No. 10,061,313.

(60) Provisional application No. 62/233,930, filed on Sep. 28, 2015.

(51) Int. Cl.
| | | |
|---|---|---|
| *B60W 30/08* | (2012.01) | |
| *G05D 1/00* | (2006.01) | |
| *B60T 8/1755* | (2006.01) | |
| *G05D 1/02* | (2020.01) | |
| *B60W 50/02* | (2012.01) | |

(52) U.S. Cl.
CPC ........ *G05D 1/0077* (2013.01); *B60T 8/17557* (2013.01); *B60T 8/17558* (2013.01); *B60W 30/08* (2013.01); *G05D 1/0088* (2013.01); *G05D 1/0212* (2013.01); *B60T 2270/406* (2013.01); *B60W 2050/0215* (2013.01); *B60Y 2302/05* (2013.01); *G05D 2201/0212* (2013.01); *G05D 2201/0213* (2013.01)

(58) Field of Classification Search
CPC ........ G05D 1/0077; G05D 2201/0213; G05D 2201/0212; G05D 1/0212; G05D 1/0088; B60Y 2302/05; B60W 2050/021; B60W 30/08; B60T 2270/406; B60T 8/17558; B60T 8/17557

See application file for complete search history.

(56) References Cited

U.S. PATENT DOCUMENTS

| | | |
|---|---|---|
| 9,260,092 B1 | 2/2016 | Lombrozo |
| 9,349,284 B2 | 5/2016 | Cudak |
| 9,616,896 B1 | 4/2017 | Letwin |
| 9,669,827 B1 * | 6/2017 | Ferguson .......... B60W 50/0097 |
| 9,914,463 B2 * | 3/2018 | Otsuka ................ G05D 1/0061 |

(Continued)

FOREIGN PATENT DOCUMENTS

| | | |
|---|---|---|
| DE | 102013213171 | 1/2015 |
| JP | 2002032125 | 1/2002 |
| JP | 2015141422 | 8/2015 |

OTHER PUBLICATIONS

ISR and Written Opinion in PCT/US2016/054250 dated Jan. 26, 2017.

(Continued)

*Primary Examiner* — Mathew Franklin Gordon
(74) *Attorney, Agent, or Firm* — Dority & Manning, P.A.

(57) ABSTRACT

An autonomous vehicle which includes multiple independent control systems that provide redundancy as to specific and critical safety situations which may be encountered when the autonomous vehicle is in operation.

20 Claims, 3 Drawing Sheets

(56) References Cited

U.S. PATENT DOCUMENTS

| | | |
|---|---|---|
| 10,061,313 B2 * | 8/2018 | Letwin ............... G05D 1/0088 |
| 2005/0115753 A1 | 6/2005 | Pemberton |
| 2007/0198145 A1 * | 8/2007 | Norris .................... G05D 1/021 |
| | | 701/23 |
| 2009/0018717 A1 | 1/2009 | Reed |
| 2010/0179715 A1 | 7/2010 | Puddy |
| 2010/0228417 A1 | 9/2010 | Lee |
| 2010/0256836 A1 | 10/2010 | Mudalige |
| 2011/0241862 A1 | 10/2011 | Debouk |
| 2011/0288695 A1 | 11/2011 | Gariepy |
| 2012/0035788 A1 | 2/2012 | Trepagnier |
| 2012/0280662 A1 | 11/2012 | Krauer |
| 2013/0131907 A1 | 5/2013 | Green |
| 2014/0156133 A1 | 6/2014 | Cullinane |
| 2014/0244096 A1 | 8/2014 | An |
| 2014/0257661 A1 | 9/2014 | Schulman |
| 2014/0350768 A1 | 11/2014 | Filippov |
| 2014/0358353 A1 | 12/2014 | Ibanez-Guzman |
| 2015/0062168 A1 | 3/2015 | Ng-Thow-Hing |
| 2015/0266474 A1 * | 9/2015 | Gustafsson ........... B60W 30/02 |
| | | 701/41 |

OTHER PUBLICATIONS

International Search Report and Written Opinion for PCT/US2016/054250, dated Jan. 26, 2017, 17 pages.

Extended European Search Report for EP 16852522.8 dated Sep. 21, 2018, 9 pages.

EESR issued in EP 16852522.8 dated Sep. 21, 2018.

* cited by examiner

AUTONOMOUS VEHICLE WITH INDEPENDENT AUXILIARY CONTROL UNITS

RELATED APPLICATIONS

This application is a continuation of U.S. patent application Ser. No. 15/279,165, filed Sep. 28, 2016, which claims benefit of priority to Provisional U.S. Patent Application No. 62/233,930, filed Sep. 28, 2015; the aforementioned priority applications being hereby incorporated by reference in their entirety.

TECHNICAL FIELD

Examples described herein relate to autonomous vehicles, and more specifically, to an automated vehicle with an independent bypass response.

BACKGROUND

Autonomous vehicles refer to vehicles which replace human drivers with sensors and computer-implemented intelligence, sensors and other automation technology. Under existing technology, autonomous vehicles can readily handle driving with other vehicles on roadways such as highways. However, urban settings can pose challenges to autonomous vehicles, in part because crowded conditions can cause errors in interpretation of sensor information.

DETAILED DESCRIPTION

Figure 1:
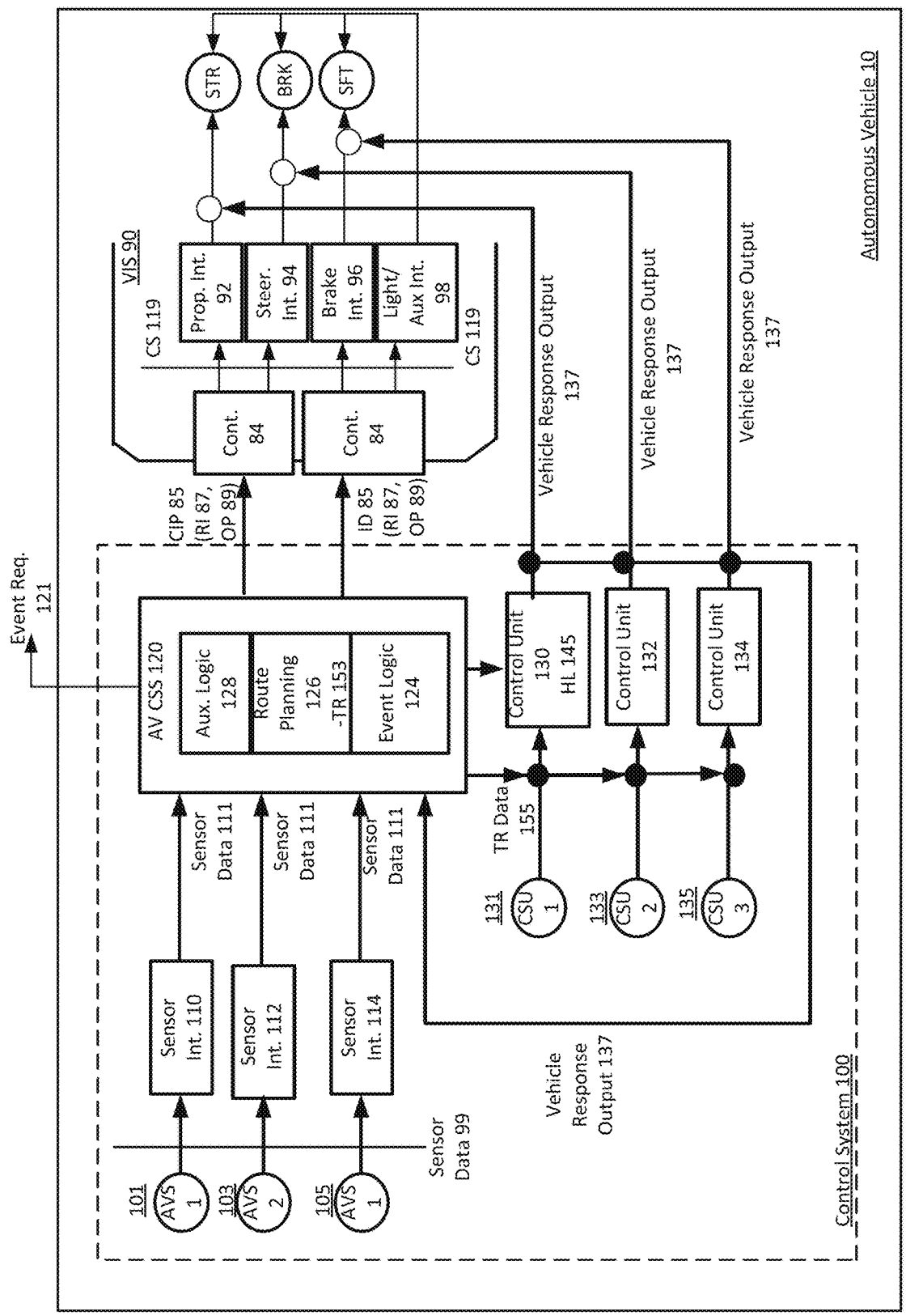
FIG. 1 illustrates an example of a control system for operating an autonomous vehicle.

Examples described include an autonomous vehicle which includes multiple independent control systems that provide redundancy as to specific and critical safety situations which may be encountered when the autonomous vehicle is in operation.

In some examples, an autonomous vehicle includes a set of vehicle interfaces, an autonomous control system, and a bypass control unit. The set of vehicle interfaces may be provided or associated with at least one vehicle control device or feature (e.g., brake, steering, shifter) of the vehicle. The autonomous control system includes multiple sensors of different types, as well as processing resources which selectively operate and control the vehicle in normal operational conditions. When the vehicle is in operation, the processing resources can operate to receive input signals from individual sensors of the multiple sensors, (ii) determine, from the input signals, an action or state of the vehicle based on the input signals, and (iii) signal one or more control parameters corresponding to the determined action or state to a corresponding one or more of the vehicle interfaces of the set. The vehicle can also include a bypass control unit, which operates independently of the autonomous control system, to detect a specific set of conditions or events, and to implement a predetermined response to the detected condition or event using a preselected vehicle interface of the set of vehicle interfaces.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried and/or executed. In particular, the numerous machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, aspects may be implemented in the form of computer programs.

System Overview

FIG. 1 illustrates an example of a control system for operating an autonomous vehicle. In an example of FIG. 1, a control system 100 is used to autonomously operate a vehicle 10 in a given geographic region for a variety of purposes, including transport services (e.g., transport of humans, delivery operations, etc.). In examples described, an autonomously driven vehicle can operate without human action which would otherwise operate the vehicle. For example, in the context of automobiles, an autonomously driven vehicle can steer, accelerate, shift, brake and operate lighting components. Some variations also recognize that an autonomous-capable vehicle can be operated either autonomously or manually.

With reference to an example of FIG. 1, the vehicle 10 includes multiple independent control systems to provide different levels of functionality and/or autonomy for the vehicle 10, based on existence or non-existence of pre-defined conditions or events. In particular, examples provide for the vehicle 10 to include a primary control system (e.g., AV CCS 120) and one or more auxiliary control units (e.g., controllers 130, 132, 134). Depending on implementation and variation, the auxiliary control unit(s) can have alternative operational modes or purpose. In some examples, one or more auxiliary control units are operable in order to implement a failsafe or bypass of the primary control system.

As an addition or alternative, one or more auxiliary control units are operable in order to implement trajectory verification for the primary control system. For example, the primary control system may provide input for the auxiliary control units, corresponding to any one or more of (i) a current location of the vehicle; (ii) multiple possible locations of the vehicle along a planned or projected location of the vehicle a short time in the future (e.g., 5-15 seconds in the future); (iii) a possible but improbable location of the vehicle in the future (e.g., failsafe trajectory locations as calculated by the primary control system); and/or (v) multiple possible locations of the vehicle as anticipated by the primary control system based on one or more possible conditions or events. The auxiliary control unit(s) may operate independently to process the alternative vehicle location input (including the vehicle's position at one or more points in time in the future) in order to determine whether the sensors utilized by that controller generate an alert (e.g., potential vehicle collision). The auxiliary control units may signal back a response that can be binary (e.g., alert/no alert). In variations, the auxiliary control unit(s) may signal back a response that can include a warning and/or data that identifies a hazard or potential hazard. Still further, the auxiliary control unit(s) may signal back an instruction or instructive action on a vehicle action, depending on whether the auxiliary control unit determines there exists a hazard (e.g., "brake moderately").

When operated to implement a bypass or failsafe operation, one or more auxiliary control unit may be configured to provide an avoidance or mitigation vehicle response to one or more predefined conditions or events. The particular predefined conditions or events can correspond to predefined conditions or events which reflect an imminent safety concern. When the autonomous vehicle 10 operates as expected, it may be the case that such conditions or events are not encountered, or encountered very infrequently, so that the ultimate control of the vehicle only resides with one control system which enables the autonomous operation. However, in some examples, when a safety condition arises, a corresponding auxiliary control unit may determine the vehicle response, independent of the control system of the autonomous vehicle. Thus, an example of FIG. 1 provides for multiple independent control systems which provide redundancy for specific events or conditions which may impact the safety of passengers or persons nearby. In one aspect, the control system 100 of the vehicle 10 includes an autonomous vehicle (AV) control sub-system 120, and one or more auxiliary control units 130, 132, 134. The auxiliary control units 130, 132, 134 may operate independently of the AV control sub-system 120 and of each other. In some examples, the control units 130, 132, 134 can correspond to modularized functionality (e.g., pre-packaged) that serves to provide a vehicle response output 137 that corresponds to a predefined vehicle response action in the event that a predetermined condition or event is detected by the respective control unit.

When operated in a trajectory verification mode, the AV control sub-system 120 may continuously calculate one or more trajectories 153, and then communicate data about one or more planned trajectories ("trajectory data 155") to at least one control unit 130, 132, 134. For example, the trajectory data 155 may include future (e.g., 1 second ahead, 5 seconds ahead) location points of the vehicle 10 along the planned trajectory. The control units 130, 132, 134 may utilize the trajectory data 155 to determine an anticipated vehicle response output 137. The anticipated vehicle response output 137 may be communicated to the AV control sub-system 120, which then processes the output to verify or select a primary trajectory of the vehicle 10. The vehicle response output 137 can be received and processed by the AV control sub-system 120 as a priority input, so as, for example, to supersede a determination of the AV control sub-system 120 that the planned trajectory 153 (e.g., path of vehicle for 5-15 seconds in the future) is safe. In variations, the vehicle response output 137 can be received and processed by the AV control sub-system 120 to weight factors for or against the selection of a planned trajectory 153 as being the safest.

When operated in a trajectory verification mode, the auxiliary control units 130, 132, 134 may determine the vehicle response output 137 based on sensor data generated from sensors 131, 133, 135 that are used by the respective sensors 131, 133, 135 control units. The vehicle response output 137 of each auxiliary control unit 130, 132, 134 may be communicated to a corresponding vehicle interface component or controller, in order to implement a corresponding vehicle response action. The vehicle response action may seek to mitigate (e.g., reduce the energy of a potential collision to below a threshold where human injury or death may result) or avoid a collision.

Depending on the design and implementation of the control unit 130, 132, 134, the predefined vehicle response action can correspond to one of (i) a single action or action type (e.g., braking or steering), (ii) a single action or action type of a magnitude (e.g., brake pressure), duration or other characteristic (e.g., maneuvering of steering mechanism) as selected by the control unit 130, 132, 134 in operation, or (iii) multiple possible types of actions, or combinations of actions, of attributes which can be set through determinations of the control unit 130, 132, 134. Accordingly, the control units 130, 132, 134 provide a finite set of possible vehicle responses when activated or triggered.

In variations, the auxiliary control units 130, 132, 134 can incorporate a variety of different design aspects or attributes for purpose of emphasizing or optimizing for reliability. By optimizing for reliability, the safety objective of the auxiliary control units 130, 132, 134 is preserved. By way of example, the auxiliary control units 130, 132, 134 can be based on a hardware (or firmware) architecture, or alternatively, reliable software architectures which eliminate or minimize dynamic memory allocation. The architecture of the auxiliary control units 130, 132, 134 can also minimize programmatic characteristics such as interrupts, pointers, or global variables. Other aspects for implementation of auxiliary control units 130, 132, 134 can provide for parallel redundancy within the same component or module. Still further, in some implementations, the auxiliary control units 130, 132, 134 are designed or optimized for reliability, so that either the auxiliary control units 130, 132, 134, or critical components of the respective control units, satisfy a predetermined reliability metric (e.g., number of failures per 10EXP5 events is less than a threshold number). Further still, in some implementations, one or more of the auxiliary control units 130, 132, 134 satisfy the Automotive Safety Integrity Level (ASIL) definition for safety or reliability.

In one implementation, the AV control sub-system 120 can utilize specific sensor resources in order to intelligently operate the vehicle in most common driving situations. For example, the AV control sub-system 120 can operate the vehicle 10 by autonomously steering, accelerating and braking the vehicle 10 as the vehicle progresses to a destination. The AV control sub-system 120 can perform vehicle control actions (e.g., braking, steering, accelerating) and route planning using sensor information, as well as other inputs (e.g., transmissions from remote or local human operators, network communication from other vehicles, etc.).

According to examples, the one or more control units 130, 132, 134 operate independent of the AV control sub-system 120. The control units 130, 132, 134 can be integrated into the vehicle 10 as failsafes, for (i) conditions or events that may be missed or mishandled by the AV control sub-system 120, and/or (ii) conditions or events which may arise if the AV control sub-system 120 malfunctions. While they auxiliary control units 130, 132, 134 may lack sufficient sensors and intelligence to independently operate the vehicle autonomously, examples recognize that such devices can be reliable and provide redundancy for specific situations where redundancy benefits safety. In this way, the control units 130, 132, 134 can be implemented as designated or dedicated resources that serve to prevent an unwanted outcome (e.g., collision with object in front of vehicle, dangerous lane change, etc.).

In an example of FIG. 1, the AV control sub-system 120 includes a computer or processing system which operates to process sensor information on the vehicle in order to interface and control the vehicle 10. In some variations, the AV control sub-system 120 can include other functionality, such as wireless communication capabilities, to send and/or receive wireless communications with one or more remote sources. In controlling the vehicle, the AV control sub-system 120 can issue instructions and data which programmatically controls various electromechanical interfaces of the vehicle 10. The instructions can serve to control aspects of the vehicle in motion, including propulsion, braking, steering, and auxiliary behavior (e.g., turning lights on).

Examples recognize that urban driving environments pose significant challenges to autonomous vehicles. In urban environments, events such as road construction, public events, road obstructions, and emergencies continuously demand responses which are sometimes unpredictable or unique. Accordingly, examples provided herein recognize that the effectiveness of autonomous vehicles in urban settings can be limited by the limitations of autonomous vehicles in recognizing and understanding how to handle the numerous daily events of a congested environment.

The autonomous vehicle 10 can be equipped with multiple types of sensors 101, 103, 105, which combine to provide a computerized perception of the space and environment surrounding the vehicle 10. Likewise, the AV control sub-system 120 can operate within the autonomous vehicle 10 to receive sensor data from the collection of sensors, and to control various electromechanical interfaces for operating the vehicle on roadways.

In more detail, the sensors 101, 103, 105 operate to collectively obtain a complete sensor view of the vehicle 10, and further obtain information about what is near the vehicle, as well as what is near or in front of a path of travel for the vehicle. By way of example, the sensors 101, 103, 105 include multiple sets of cameras sensors 101 (video camera, stereoscopic pairs of cameras or depth perception cameras, long range cameras), remote detection sensors 103 such as provided by radar or Lidar, proximity or touch sensors 105, and/or sonar sensors (not shown).

Each of the sensors 101, 103, 105 can communicate with, or utilize a corresponding sensor interface 110, 112, 114. Each of the sensor interfaces 110, 112, 114 can include, for example, hardware and/or other logical component which is coupled or otherwise provided with the respective sensor. For example, the sensors 101, 103, 105 can include a video camera and/or stereoscopic camera set which continually generates image data of an environment of the vehicle 10.

The sensor interfaces 110, 112, 114 can include a dedicated processing resource, such as provided with a field programmable gate array ("FPGA") which receives and/or processes raw image data from the camera sensor. In some examples, the sensor interfaces 110, 112, 114 can include logic, such as provided with hardware and/or programming, to process sensor data 99 from a respective sensor 101, 103, 105. The processed sensor data 99 can be outputted as sensor data 111. As an addition or variation, the AV control sub-system 120 can also include integrated include logic for processing raw or pre-processed sensor data 99.

According to one implementation, the vehicle interface system 90 can include or control multiple vehicle interfaces, including a propulsion interface 92, a steering interface 94, a braking interface 96, and lighting/auxiliary interface 98. The vehicle interface system 90 and/or AV control sub-system 120 can include one or more controllers 84 which receive command input 85 from the AV control sub-system 120. The command input 85 can include route information 87 and one or more operational parameters 89 which specify an operational state of the vehicle (e.g., desired speed and pose, acceleration, etc.). The controller(s) 84 generate control signals 119 from the command input 85 for one or more of the vehicle interfaces 92, 94, 96, 98, so as to control propulsion, steering, braking and other vehicle behavior while the autonomous vehicle 10 follows a route. Thus, while the vehicle 10 may follow a route, the controller(s) 84 can continuously adjust and alter the movement of the vehicle in response to receiving the sensor data 111. Absent events or conditions which affect the confidence of the vehicle in safely progressing on the route, the AV control sub-system 120 can generate additional instructional input 85 from which the controller(s) 84 process sensor data 111 to generate various vehicle control signals 119 for the different interfaces of the vehicle interface system 90.

In an example, the AV control sub-system 120 includes event determination logic 124, route planning logic 126 and auxiliary services 128. The event determination logic 124 operates to detect events or conditions which have lowered levels of confidence in terms of the vehicle's understanding. In one implementation, event determination logic 124 can generate a confidence score or value for individual events or conditions which are detected from sensor data 111. The confidence score or value can correlate to an indication of how safely the vehicle 10 is able to handle the event or condition. For example, if the event corresponds to the occurrence of rain, or the appearance of a large pothole in the road, the confidence score as determined by event determination logic 124 can be relatively high, meaning the AV control sub-system 120 has a confident understanding of what the event or condition is, and also on how to respond (e.g., ignore the event, change lanes if possible, etc.) to the event. The event determination logic 124 can determine when an event or condition results in a confidence value that is below a threshold. The threshold can be selected by implementation or design to signify the point where the understanding of the AV control sub-system 120 of the event or condition, and/or the action that should be undertaken by the autonomous vehicle 10, is too low for reliance.

The route determination logic 126 can determine the route for the autonomous vehicle, and further determine one or more trajectories 153 for the vehicle 10 in completing a route. The route can be determined from, for example, a human passenger. The trajectory can reflect an immediate segment of the route, including the current and future vehicle pose, lane position, and speed. In some variations, the route determination logic 126 can repeatedly determine the trajectory 153 as a failsafe that is preplanned for a duration of time in the future (e.g., 5-15 seconds), in order to maintain vehicle safety in the event the AV control sub-system 120 fails (e.g., controller shuts down, cataclysmic failure). As a failsafe, the implementation of the trajectory 153 can, for example, one, or a combination of action that include lane keeping (including velocity keeping), braking, and steering (e.g., pulling over).

The auxiliary service 128 can include functionality for enabling remote-assistance for purpose of facilitating the AV control sub-system 120 to resolve unknown events or conditions. The auxiliary service 128 can generate an event request 121 from a remote service if the event determination logic 124 determines that a planned or likely action to an event or condition has a relatively low confidence score. For example, the vehicle 10 may plan to swerve left for safety, but the sensor data 111 may see loose dirt in the open space, resulting in uncertainty as to whether the planned or likely maneuver is safe. The auxiliary service 128 can communicate the event request 121 to one or more network services, which can provide assistance in the form of, for example, remote input for classifying the unknown condition or event.

According to some examples, the auxiliary control units 130, 132, 134 include corresponding dedicated sensor sets 131, 133, 135 which monitor a particular aspect of a vehicle's environment. By way of example, the sensor sets 131, 133, 135 of the auxiliary control units 130, 132, 134 can includes sensors (e.g., image, sonar, radar, Lidar) to monitor regions adjacent the vehicle (e.g., adjacent lane, behind vehicle, cross-lane traffic, surrounding roadside region, etc.) The auxiliary control units 130, 132, 134 can be optimized for reliable operation to detect specific conditions such as adjacent lane occupancy, imminent collision (front, rear, side), cross-traffic, red light, construction or hazard zone, and/or roadway hazard (e.g., road narrowing). Each of the auxiliary control units 130, 132, 134 can operate reactively when a specific condition of that control unit is detected.

Each of the auxiliary control units 130, 132, 134 can generate a vehicle response output 137 automatically, upon detecting a particular sensor condition. According to one aspect, the auxiliary control units 130, 132, 134 generate the vehicle response output 137 using resources which are integrated with or dedicated for the respective control unit. The vehicle response output 137 of each control unit 130, 132, 134 can be different, and based on the desired actions that are to be performed by the vehicle when a given event or condition is encountered. As described with other examples, the vehicle response output 137 of a given auxiliary control unit 130, 132, 134 can be predefined in that it may correspond to (i) a single action performed in a given way (e.g., apply brakes with as much magnitude as possible continuously), (ii) a single action which can be performed in one of multiple possible ways (e.g., apply brakes at pressure determined from sensor input), and/or (iii) a select action, or combination of actions, based on sensor input and a determination by one or more of the auxiliary control units 130, 132, 134.

When operated to implement a failsafe or bypass, the auxiliary control units 130, 132, 134 can generate the vehicle response output 137 to be subject to a feedback control. For example, one of the auxiliary control units 130, 132, 134 can be triggered to initiate a steering maneuver which is to satisfy a given criteria of the control unit. The steering maneuver can result in the auxiliary control unit 130, 132, 134 using independent sensor input (e.g., forward facing camera and side camera) to pull the vehicle to the side of the road in the event of a cataclysmic event where the AV control sub-system 120 is disabled. Thus, the specific maneuvering may not be known prior to the occurrence of the event or condition, but the type of action (e.g., steering) and/or the desired outcome (e.g., move vehicle 10 to the side of the road) may be determined by the auxiliary control unit 130, 132, 134, that responds to the sensed event or condition.

Some examples provide that the vehicle response output 137 signaled from each auxiliary control unit 130, 132, 134 (to either the AV control sub-system 120 for trajectory verification, to vehicle interface components for bypass/failsafe action) can be incorporated as predefined functionality of that control unit. In such implementations, some variations provide that the vehicle response output 137 is set so that there is no variation. For example, the vehicle response output 137 from one control unit 130 may provide that when the control unit senses a predetermined condition or event (e.g., object in front of vehicle was collision probability), the vehicle 10 must come to a complete stop as soon as possible. The control unit 130 may thus interact with the brake interface 96 until the corresponding sensor 131 census of the vehicle has come to a stop.

In other variations, the particular action that is specified with the vehicle response output 137 can be conditioned for duration and/or magnitude. For example, in the preceding example, the auxiliary control unit 130, 132, 134 may generate the vehicle response output 137 of braking until the vehicle either comes to a complete stop, or until the sense condition (e.g., obstruction in front of vehicle) is detected as being alleviated or nonexistent.

Still further, the vehicle response output 137 may specify an action that may vary between a hard or moderate brake depending on design and implementation of the particular auxiliary control unit 130, 132, 134. As an addition or variation, the type of action required from the vehicle 10 can also vary. For example, if the auxiliary control unit 130 is to generate a hard brake, the type of braking application that is performed can be selected based on factors detected by the sensor set 131 of the control unit 130. As another example, the auxiliary control unit 130 may detect from the brakes of the vehicle 10 (or from the Onboard Diagnostic information) that the brakes or wet or worn, and in response, perform an alternative braking action such as pulsing the brakes before applying a hard and steady force to the brakes.

Still further, the auxiliary control unit 130, 132, 134 can generate the vehicle response output 137 to specify multiple types of vehicle actions. For example, the action specified by the vehicle response output 137 of the vehicle 10 may be responsive to an event or condition of the control unit 130 that includes (i) apply braking, (ii) steering (e.g., veer the vehicle 10 to the side of the road), and (iii) light operation (e.g., turn emergency lights on).

In some variations, the auxiliary control units 130, 132, 134 can detect multiple conditions or events, or alternatively multiple aspects of a predetermined condition or event (e.g., level traffic, vehicle speed, weather etc.), and then select or determine the vehicle response output 137 by type and/or magnitude, based on the detected condition or condition aspect. For example, the activated control unit 130 can include a table that specifies the type of action is to be performed, as well as the magnitude or result of such action, based on the detected event or condition.

One or more of the auxiliary control units 130, 132, 134 can alternatively monitor internal events or conditions of the vehicle, such as engine or radiator temperature, in order to generate an appropriate, reactive response to a malfunction event or condition. Thus, for example, the AV control sub-system 120 can perform various operations to determine a trajectory for the vehicle 10, and to implement the determined trajectory by communicating control parameters for operation of the vehicle to control devices and interfaces, represented by vehicle interface 90. In some examples, more urgent or critical feedback from the vehicle can be detected and handled by one or more of the auxiliary control units 130, 132, 134. In some examples, the auxiliary control units 130, 132, 134 can monitor for and detect predetermined conditions or events, and then signal a vehicle response output 137 to one or more vehicle interfaces of the vehicle 10. The vehicle response output 137 may identify a vehicle action or state for a corresponding vehicle control device or interface.

In variations, the auxiliary control units 130, 132, 134 can communicate the vehicle response output 137 to the AV control sub-system 120 of the vehicle 10. In such implementations, the auxiliary control units 130, 132, 134 may determine the vehicle response output 137 using trajectory input 155, as well as sensor input from, for example, a corresponding sensor that is used by that control unit. For example, the auxiliary control unit 130, 132, 134 may calculate the vehicle response output 137 based on the future location of the vehicle along the planned trajectory 153 The vehicle response output 137 can be communicated repeatedly to, for example, verify the trajectory 153, which in turn may be repeatedly or continuously calculated by the AV control sub-system 120. The AV control sub-system 120 may use a vehicle action or state (if any) as provided by the vehicle state output to verify, for example, that the planned trajectory 153 of the vehicle 10 is safe.

Still further, in variations, the auxiliary control units 130, 132, 134 can communicate the vehicle response output 137 to the AV control sub-system 120 as a response to the auxiliary control units detecting (from sensor data of respective sensors 131, 133, 135) a predetermined condition or event that merits a particular vehicle action or state. The AV control sub-system 120 may then determine or recalculate the trajectory 153 of the vehicle to, for example, avoid or mitigate a collision.

Accordingly, in some examples, the auxiliary control units 130, 132, 134 are structured or designed to detect one or more types of pre-defined or predetermined events or conditions, and further to reactively generate the vehicle response output 137 based on a detected event or condition. When the specific condition of each control unit 130, 132, 134 is detected, the auxiliary control unit may trigger a response. Depending on implementation, the individual control units 130, 132, 134 can signal the vehicle response output 137 to the AV control sub-system 120, or to one or more vehicle interface components. The vehicle response output 137 may specify a predefined (and possibly selected) action or combination of actions (e.g., braking, braking and switching the vehicle off, braking and steering, steering only). In some variations, one or more of the auxiliary control units 130, 132, 134 can cause the corresponding vehicle response output 137 to be performed or sustained until another condition or event occurs. Furthermore, the condition or event that deactivates the auxiliary control unit(s) 130, 132, 134 and returns control to the AV control sub-system 120 can correspond to (i) the triggering event or condition clearing (e.g., imminent collision object is no longer present), or (ii) to the vehicle 10 achieving a desired operational state (e.g., vehicle slows down substantially or comes to a stop).

According to examples, the auxiliary control units 130, 132, 134 can operate independently of the AV control sub-system 120. Thus, for example, the control units 130, 132, 134 can utilize sensors that are dedicated to the particular control unit, or otherwise independent of the sensors that are used by the AV control sub-system 120. The control units 130, 132, 134 can also utilize different communication busses and logic. Each of the auxiliary control units 130, 132, 134 can also interface directly with the corresponding operational elements of the vehicle 10. The auxiliary control units 130, 132, 134 can also operate outside of the programming and/or software which operates the AV control sub-system 120. In this way, the auxiliary control units 130, 132, 134 may provide an independent and redundant response for specific events or conditions.

In an example of FIG. 1, the auxiliary control units 130, 132, 134 can interface directly with the respective vehicle interface 92, 94, 96, 98 that is to provide the desired vehicle action or operational state. By way of example, the predetermined vehicle actions may include (i) bringing the vehicle to a stop, (ii) bringing the vehicle to a particular velocity, (iii) maintaining the vehicle to move within a lane, (iv) pulling the vehicle to a roadside stop, (v) performing a lane change action.

In some variations, the auxiliary control units 130, 132, 134 can signal the vehicle response output 137 to the controller 84 or other vehicle interface of the vehicle. In either implementation, the vehicle response output 137 can take priority over any other control signal generated from the AV control sub-system 120. For example, the vehicle response output 137 can correspond to an analog signal that is communicated directly to one of the vehicle interfaces 92, 94, 96, 98 which is to be controlled by the response of the particular control unit 130, 132, 134. Individual vehicle interfaces 92, 94, 96, 98 can thus be directly controlled by two or more independent control mechanisms of the vehicle 10, such as the AV control sub-system 120 and one or multiple control units 130, 132, 134.

Alternatively, vehicle control mechanism such as the brakes, shifter, accelerator, or steering mechanism can be directly controlled through a separate electromechanical interface that is not accessible to the AV control sub-system 120. In this way, the auxiliary control unit 130, 132, 134 can implement the vehicle response output 137 directly onto the vehicle control mechanism where the desired vehicle action is to be performed. As another variation, the vehicle response output 137 can be signaled to the controller 84, which then provides a direct electromechanical interface with the respective vehicle interface 90-98.

With respect to examples of FIG. 1, the vehicle response output 137 from an auxiliary control unit 130, 132, 134 can be communicated to the respective vehicle interface 90-98, to result in the vehicle 10 implementing a bypass of command input 85, or other active control parameters provided through the AV control sub-system 120. When one of the auxiliary control units 130, 132, 134 detects a predefined condition or event, the control parameters or input corresponding to the vehicle response output 137 are implemented on predetermined vehicle interfaces 92, 94, 96, 98 over command input 85 from the AV control sub-system 120.

In some examples, the vehicle interfaces 92, 94, 96, 98 are structured physically to prioritize the vehicle response output 137 from auxiliary control unit 130, 132, 134 over control parameters, trajectory input or other operations or instructions specified from the AV control sub-system 120. The result is that the vehicle response output 137 is implemented at least partially (e.g., emergency brake) without there being any programmatic or logical decision as to the appropriate vehicle response. Such implementation anticipates a worst-case scenario in which the vehicle 10 encounters an unknown environment in which the programming or logic causes the vehicle 10 to perform a possibly unsafe action. Still further, an example of FIG. 1 also anticipates situations in which the AV control sub-system 120 malfunctions (e.g., freezes, encounters a bug, etc.). Even if the AV control sub-system 120 becomes completely incapacitated because of cataclysmic event (e.g., software malfunction, external event), control units 130, 132, 134 can operate independently, using resources which are not part of the AV control sub-system 120, in order to bring the vehicle to a safe condition (e.g., part along right side).

In some variations, one of the auxiliary control units 130, 132, 134 can provide a dedicated failsafe response to a condition or event in which the AV control sub-system 120 malfunctions. For example, the auxiliary control units 130, 132, 134 can monitor 125 for the health of the AV control sub-system 120 and generate a predetermined response output 137 for respective vehicle interfaces 90-98 should the health status of the AV control sub-system 120 indicate a malfunction. For example, health logic 145 can be integrated or coupled with the auxiliary control unit 130 to determine when the AV control sub-system 120 is malfunctioning. In response to a determination that the AV control sub-system 120 is not functioning properly, the auxiliary control unit 130 can trigger a predetermined action (as implemented through the vehicle response output 137) in which, depending on implementation, the vehicle 10 comes to a stop, or steers to the side of the road and then stops, or maintains its position in a lane of the road as the vehicle continues forward.

Still further, while the auxiliary control units 130, 132, 134 can operate to generate the desired vehicle state, in variations; the resulting vehicle response output 137 can generate a sensed action that results in the AV control sub-system 120 performing an alternative vehicle response for ultimately handling the situation. For example, the vehicle response output 137 from one or more of the control units 130, 132, 134 may be to slow down sharply until the vehicle is stopped or until the vehicle steers to the side of road. The AV control sub-system 120 can detect a sudden brake from one of the control units 130, 132, 134 and automatically (i) determine (from the activated condition of the particular control unit 130) what the condition or event may be, and (ii) perform a complementary action to the vehicle response output 137. For example, the control unit 130 may activate to perform a sudden brake, and the AV control sub-system 120 may detect the activation of a specific auxiliary control unit 130, and perform a complementary action of steering to the side of the road, requesting remote assistance (e.g., via auxiliary service 128) and/or switching on hazard lights.

Still further, while examples provide for the auxiliary control units 130, 132, 134 to operate in a mode or configuration to override or bypass the AV control sub-system 120, an additional logical component can be utilized to plan for the use of the vehicle response output 137 from one or more auxiliary control units 130, 132, 134 should such output be generated from any one of the control units. In one implementation, the AV control sub-system 120 can include low confidence indicators for a particular situation or environment, and a component such as the controller 84 can implement the logic to discard or bypass the command input from the AV control sub-system 120 in favor of the vehicle response output 137 from an activated one of the control units 130, 132, 134. Still further, the AV control sub-system 120 can in some situations avoid issuing command input 85 when its own confidence score is below a threshold. In such situations, the control system 100 may plan to use the output of individual control units 130, 132, 134 in the short term, in favor of the AV control subs-sub-system 120.

While the auxiliary control units 130, 132, 134 may be integrated into the control system 100 to have priority handling with respect to their outputs, variations may also designate the priority amongst specific control units 130, 132, 134. Thus, the control system 100 may include logic or setting to prioritize the vehicle responses of two or more concurrently operating auxiliary control units 130, 132, 134.

Autonomous Vehicle Example

Figure 2:
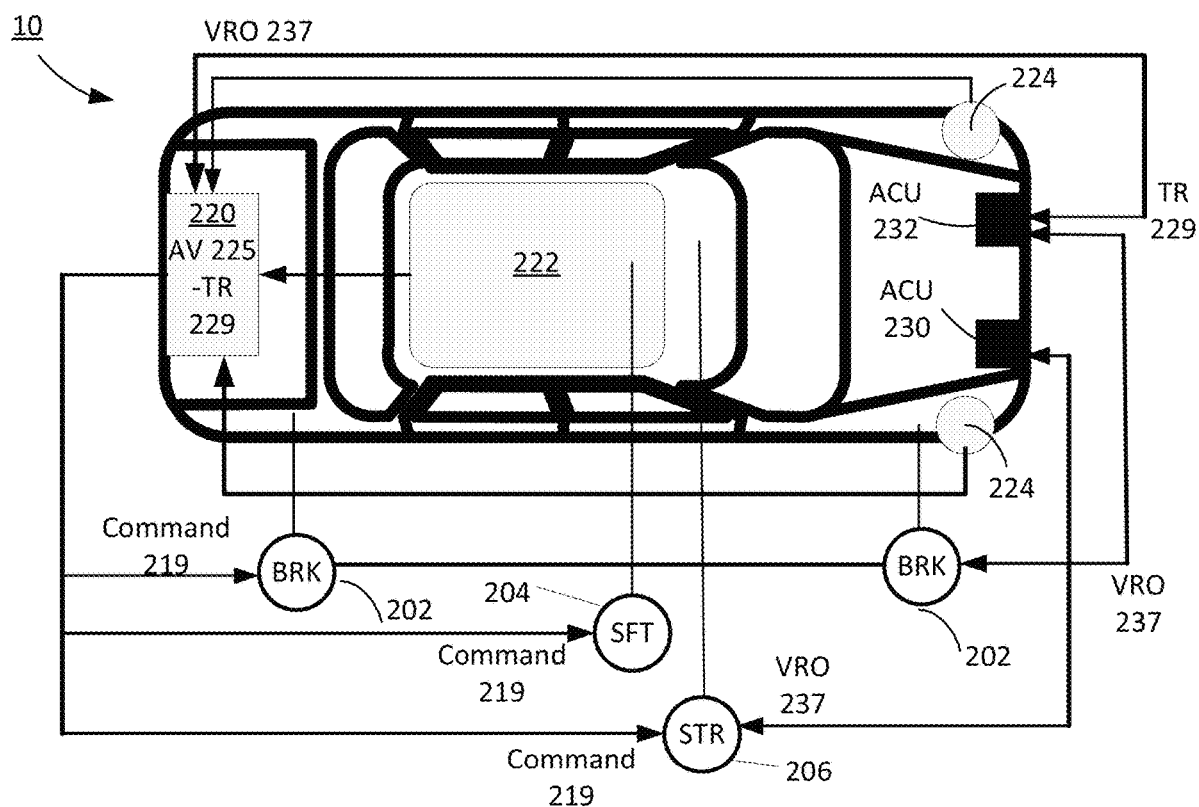
FIG. 2 illustrates an example of an autonomous vehicle that is configured to operate using multiple independent control systems.

FIG. 2 illustrates an example of an autonomous vehicle that is configured to operate using multiple independent control systems. In an example of FIG. 2, the autonomous vehicle 10 includes auxiliary control units 230, 232 provided at the front of the vehicle to detect a set of one or more types of predefined conditions or events (e.g., roadway object in path of collision). The vehicle 10 can also include an autonomous control system, implemented using a combination of processing resources 220 and associated sensors. The processing resources 220 can be centralized, distributed and/or include resources dedicated for specific resources. In operation, the processing resources 220 can implement models, decision making algorithms, routing and trajectory determination, external communications and various other processes (collectively termed "AV control 225") as part of its normal operation. For example, image based sensing equipment can be positioned in various locations of the vehicle. A top of the vehicle can multiple cameras 222 which collectively generate a 360° perspective of the vehicle. The cameras 222 on the top of the vehicle 10 can include stereoscopic camera pairs, Lidar, video camera and/or other specialized image capturing devices. Additionally, radar type sensors 224, or other types of sensors, can be positioned in suitable locations about the vehicle 10 (e.g., front corner, side mirrors, rear bumper, etc.). For example, multiple radar sensors may be distributed about a perimeter of the vehicle. Additionally, additional cameras may be mounted to the exterior of the vehicle, or within an interior of the windshield.

The vehicle 10 can include operational features (or devices) referred to as vehicle control interfaces 202, 204, 206. The vehicle control interfaces 202, 204, 206 may include braking 202 (front or back), shifter 204, and steering 206. The operational features shown are only examples, and more or fewer operational features of the vehicle 10 can be utilized with variations to examples as described. In an example of FIG. 2, the operational facets are represented by interfaces which can be commanded or otherwise controlled by individual control systems of the vehicle 10. The AV control 225 can be implemented using the processing resources 220 (e.g., shown located in the trunk of the vehicle 10), separate and independent of the control units 230, 232. Likewise, the control units 230, 232 can represent separate and independent resources from those of the AV control 225. Thus, for example, the AV control 225 and control units 230, 232 can utilize separate (i) programming or logical platforms and architecture, (ii) input sensors, and (iii) communication busses for communicating with other components of the vehicle 10, including those vehicle interfaces that are to be controlled by the respective system or units. In some variations, the AV control 225 and control units 230, 232 can include separate housings, as well as separate power busses or sources of power.

According to some examples, the processing resources 220 can include one or more processors, and/or programmatic and hardware interfaces which provide for control parameters, shown as commands 219, to be continuously generated and signaled to the individual vehicle control interfaces 202, 204, 206 of the vehicle 10 as the vehicle operates autonomously. Thus, for example, the commands 219 can be communicated from the processing resources 220 (and AV control 225) to the respective vehicle control interfaces 202, 204, 206. The processing resources 220 may calculate one or more trajectories 229 for the vehicle, and then implement the trajectories 229 via commands 219. The trajectories 229 may define one or multiple possible trajectories of the vehicle for a given future interval. For example, the trajectories 229 can include one or more primary trajectories of the vehicle, and/or a failsafe trajectory which the vehicle is to implement in the event the AV control 225 has a cataclysmic failure.

Additionally, in an example shown, the brake 202, shifter 204, and steering 206 can each be controlled by output of one of the respective control units 230, 232. In most instances (if not all instances), the AV control 225 issues the control commands 219 that are implemented by the operational features of the vehicle 10. In some examples, the AV control 225 communicates the trajectory input 229 to one or more of the auxiliary control units 230, 232 in order to receive a vehicle response output 237. The auxiliary control units 230, 232 may, for example, utilize the vehicle's anticipated position on a planned trajectory, rather than the vehicle's current location, in order to provide the vehicle response output 237 to the AV control 225. In this way, vehicle response output 237 may provide the AV control 225 with verification that one or more planned trajectories of the vehicle 10 are safe.

As an addition or variation, one or more of the auxiliary control units 230, 232 may be operated in a mode in which the vehicle response output 237 is communicated to components of the vehicle to implement a vehicle action (e.g., safety stop) or state. For example, the auxiliary control units 230, 232 may monitor for and then detect a predefined event or condition that triggers the auxiliary control units 230, 232 to communicate vehicle response outputs 237 to one or more vehicle control interfaces 202, 204, 206. In this way, one or more vehicle control interfaces 202, 204, 206, can switch immediately to be responsive to the vehicle response output 237 generated by the respective control unit 230, 232. Thus, the control units 230, 232 can generate vehicle response output 237 as a bypass the control commands 219 of the AV control 225 when a particular event or condition is encountered.

Given the sensing resources of the AV control 225, the AV control 225 can normally operate in a manner that anticipates roadway conditions which would otherwise trigger, for example, a bypass by the auxiliary control units 230, 232. However, the vehicle response output 237 generated by the control units 230, 232 can preclude or mitigate a collision or accident should the AV control 225 malfunction or misinterpret a roadway event or condition.

In some examples, the control units 230, 232 can generate the vehicle response output 237 to verify the trajectory determinations of the AV control 225. In such implementations, the control units 230, 232 can receive the trajectory 229 and generate the vehicle response output 237 continuously, or repeatedly as the vehicle is operated by the AV control 225, in order to provide verification of the planned trajectory 229 that as calculated by the AV control 225. The AV control 225 may determine, from the vehicle response output 237, that the calculated primary trajectory 229 will result in a collision. In such instances, the AV control 225 may receive and utilize the vehicle response output 237 to determine an alternative trajectory. Likewise, if the AV control 225 determines it is on a collision course, the vehicle response output 237 can identify a vehicle action which the AV control 225 can implement to avoid the collision, or to mitigate the collision (e.g., reduce the energy resulting from the collision).

In some variations, the control units 230, 232 may detect an event or condition that may result in a collision, and the vehicle response output 237 may be communicated as commands to one or more vehicle interfaces to cause the vehicle to perform an action that will mitigate or avoid a collision. Still further, in other variations, the control units 230, 232 can provide an alternative redundant control device that ensures the vehicle 10 is safely operated. Likewise, in some variations, should the AV control 225 encounter a situation where it's reaction time is too slow or incorrect (e.g., previously unencountered situation), the control units 230, 232 can provide redundant control of vehicle control features to ensure an appropriate and safe response. In one implementation, this can be accomplished by the auxiliary control units 230, 232 communicating the vehicle response output 237 to the AV control 225. The AV control 225 may then implement a specified action of the vehicle response output 237 as a priority. In variations, this can also be accomplished by the control units 230, 232 communicating the vehicle response output 237 to one or more control interfaces 202, 204, 206 of the vehicle 10, to cause the vehicle to implement a trajectory that bypasses a previous command of the AV control 225.

In some variations, numerous control units 230, 232 can be distributed to the vehicle 10 to provide a variety of different responses for numerous kinds of situations which may be missed, mishandled or otherwise pose significant safety risk in the event of malfunction of the AV control 225. Thus, separate and independent auxiliary control units 230, 232 can be provided to generate the vehicle response output 237 for implementation by the vehicle, or communication to the AV control 225. In this way, the control units 230, 232 can ensure the vehicle 10 has a safe reaction to a variety of events, such as forward obstructions, side or lane obstructions, rear collisions, traffic lights, operations of internal components etc. sub-system 120

Methodology

Figure 3:
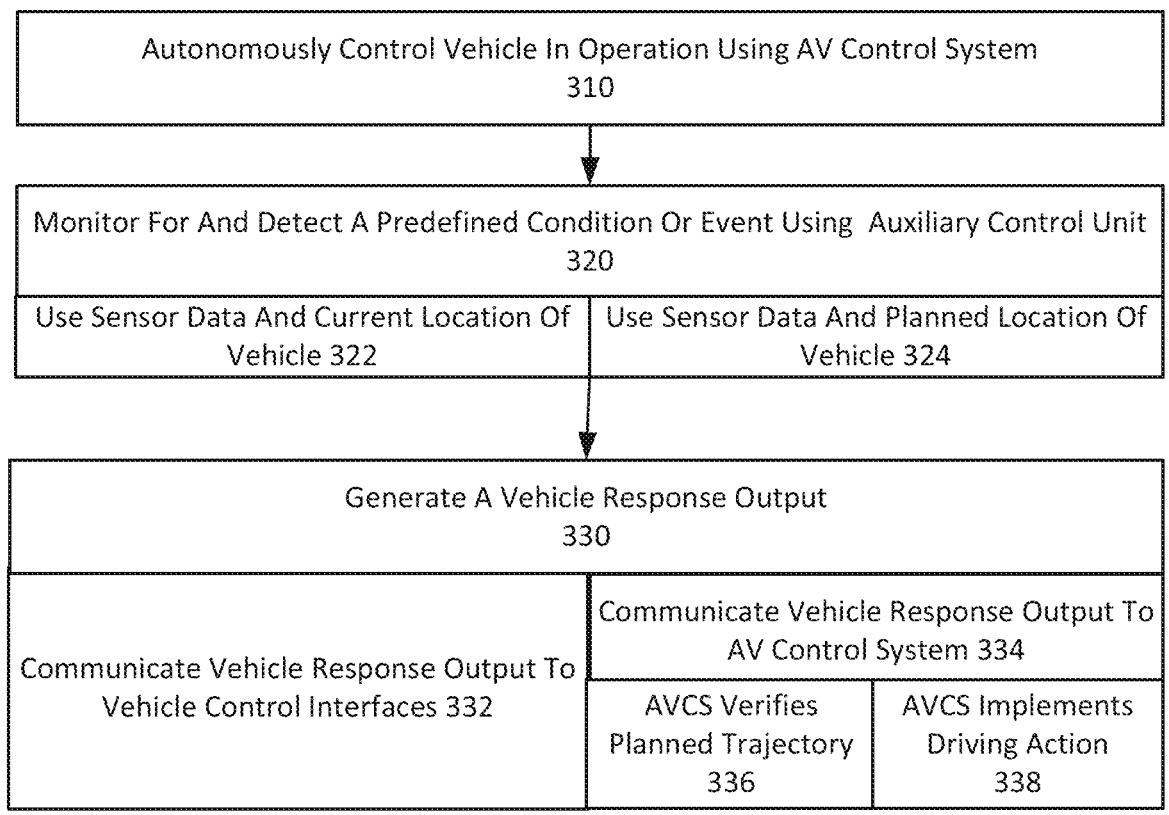
FIG. 3 illustrates an example method for operating an autonomous vehicle.

FIG. 3 illustrates an example method for operating an autonomous vehicle. In describing an example method of FIG. 3, reference may be made to elements of FIG. 1 or FIG. 2 for purpose of illustrating a suitable component or element or performing a step or sub-step being described. In particular, with reference to FIG. 1, an example method of FIG. 3 can be implemented using the control system 100.

With further reference to an example of FIG. 3, the vehicle 10 operates using the AV control sub-system 120 (310). For example, the AV control sub-system 120 can operate using processing resources 220 of the vehicle 10 in order to continuously provide control commands to various operational features of the vehicle 10. At the same time, multiple control units 130, 132, 134, 230, 232 can be distributed throughout the vehicle to operate independently of the AV control sub-system 120. The control units 130, 132, 134 can also operate independently of each other. The control units 130, 132, 134, 230, 232 can each operate as a failsafe, when specific events or conditions are encountered which may require a sudden action. By way of example, in the context of an autonomous vehicle, these events or conditions can result when the AV control sub-system 120 malfunctions, mishandles an event or condition, or otherwise is unfamiliar with the event or condition. Accordingly, the configuration and structure of the control units 130, 132, 134, 230, 232 may be such that none of the control units are ever activated.

In an example of FIG. 3, one or more of the auxiliary control units 130, 132, 134, 230, 232 can continuously operate to monitor for and detect a predefined condition or event (320). In monitoring and/or detecting the predefined condition or event, auxiliary control units 130, 132, 134, 230, 232 can process sensor data from respective sensor devices, using the current location of the vehicle (322) and/or one or more planned locations of the vehicle (324). The one or more planned locations of the vehicle 324 may correspond to, for example, the planned trajectory 153 of the AV control sub-system 120. With further reference to an example of FIG. 1, the one or more planned locations can be communicated by the AV control sub-system 120 as trajectory data 155. In either implementation, the operation of the control units 130, 132, 134, 230, 232 can be such that the condition or event that is detected necessarily raises a significant safety risk.

The control unit(s) 130, 132, 134, 230, 232 can generate a vehicle response output 137, 237 based on the vehicle's current location or one or more planned locations of the vehicle (330). The vehicle response output 137, 237 can be in the form of a control communication that specifies a vehicle state, or one or more actions the vehicle is to perform (e.g., to implement a trajectory). In some implementations, the vehicle response output 137, 237 is communicated to one or more vehicle control interfaces (e.g., vehicle interfaces for braking, accelerator, steering), as a response to the respective control unit detecting a predefined condition or event (332). The predefined condition or event can correspond to a condition detected by one or more sensors which are used by the respective control unit 130, 132, 134, 230, 232. As an alternative or variation, the predefined condition or event can correspond to a determination made about the primary control system (AV control sub-system 120). For example, one or more of the control unit 130, 132, 134, 230, 232 can monitor the AV control sub-system 120 to detect failure (e.g., cataclysmic failure) of the vehicle's primary control system. In such examples, the vehicle response output 137, 237 may cause a desired response or action from the vehicle. The desired response or action can be pre-defined, based on the implementation of the activated control unit 130, 132, 134, so as to correspond to a particular action, selected action, or selected set of actions. Furthermore, as described with other examples, the desired response or action can bypass or supersede commands provided by the AV control sub-system 120.

In other examples, the vehicle response output 137, 237 is in the form of a control communication that is communicated to the AV control sub-system 120 (334). In some variations, the AV control sub-system 120 can continuously or repeatedly communicate with the control units 130, 132, 134, 230, 232 to receive vehicle response output 137, 237. In such cases, the AV control sub-system 120 can use the vehicle response output 137, 237 to verify one or more planned trajectories of the vehicle, including one or more of a primary trajectory or a failsafe trajectory (336). In other variations, the AV control sub-system 120 can receive the vehicle response output 137, 237 from one or more of the control units 130, 132, 134, 230, 232 when the respective control unit is triggered by a sensed event or condition (338). The AV control sub-system 120 can implement an action or determine an alternative trajectory based on the vehicle response output 137, 237.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. An autonomous vehicle comprising:
a first set of vehicle sensors that monitor an environment outside the autonomous vehicle;
a second set of vehicle sensors, separate from the first set of vehicle sensors, that monitor the environment outside the autonomous vehicle;
a primary control system to control the autonomous vehicle, including to (i) receive a first sensor input from the first set of vehicle sensors, (ii) determine, from the first sensor input, a state of the environment, (iii) determine, based on the state of the environment, trajectory data representing a planned future trajectory of the autonomous vehicle that comprises one or more future locations for the autonomous vehicle and is generated for autonomously controlling a motion of the autonomous vehicle, and (iv) generate, based on the trajectory data, one or more control parameters for controlling the autonomous vehicle; and
an auxiliary control unit operating to (i) receive a second sensor input from the second set of vehicle sensors, (ii) receive the trajectory data from the primary control system for the planned future trajectory of the autonomous vehicle, (iii) detect a predefined condition or event from the second sensor input, and (iv) in response to detecting the predefined condition or event, generate a vehicle response output based at least in part on the second sensor input and the trajectory data, wherein the vehicle response output is associated with a verification of the trajectory data based at least in part on the second sensor input.

2. The autonomous vehicle of claim 1, wherein the auxiliary control unit communicates the vehicle response output to the primary control system.

3. The autonomous vehicle of claim 2, wherein the primary control system uses the vehicle response output to verify the planned future trajectory of the autonomous vehicle.

4. The autonomous vehicle of claim 1, wherein the auxiliary control unit generates the vehicle response output to specify one or more vehicle actions to one or more vehicle interfaces of the autonomous vehicle.

5. The autonomous vehicle of claim 4, wherein the auxiliary control unit communicates the vehicle response output to a preselected vehicle interface of the autonomous vehicle to cause the autonomous vehicle to perform a predetermined vehicle action or achieve a predetermined vehicle state.

6. The autonomous vehicle of claim 5, wherein the predetermined vehicle action includes one of (i) bringing the autonomous vehicle to a stop, (ii) bringing the autonomous vehicle to a particular velocity, (iii) maintaining the autonomous vehicle to move within a lane, (iv) steering the autonomous vehicle to a roadside stop, (v) performing a lane change action.

7. The autonomous vehicle of claim 5, wherein the preselected vehicle interface is configured to implement the predetermined vehicle action as a bypass to command input received from the primary control system.

8. The autonomous vehicle of claim 1, wherein the auxiliary control unit generates the vehicle response output to implement one or more predetermined actions by the autonomous vehicle in response to detecting the predefined condition or event.

9. The autonomous vehicle of claim 8, wherein the auxiliary control unit generates the vehicle response output to signal a brake interface of the autonomous vehicle to perform an emergency stop, and wherein the brake interface actuates a braking mechanism of the autonomous vehicle to come to a stop.

10. The autonomous vehicle of claim 9, wherein the auxiliary control unit generates the vehicle response output to cause a multistep action to be performed by multiple control devices of the autonomous vehicle.

11. The autonomous vehicle of claim 10, wherein the multiple control devices of the autonomous vehicle include (i) the brake interface for a braking system of the autonomous vehicle, (ii) a steering interface for a steering system of the autonomous vehicle, (iii) an accelerator interface for an acceleration mechanism of the autonomous vehicle, (iv) a shift interface for a shift operator of the autonomous vehicle, (v) a light signal interface for a vehicle light, and/or (vi) an interface for a wireless communication port of the autonomous vehicle.

12. A method for operating an autonomous vehicle, the method comprising:
    autonomously controlling the autonomous vehicle in operation using a primary control system coupled to a first set of vehicle sensors that monitor an environment outside the autonomous vehicle;
    determining, from a first sensor input from the first set of vehicle sensors, a state of the environment;
    determining, based on the state of the environment, trajectory data representing a planned future trajectory of the autonomous vehicle, the planned future trajectory comprising one or more future locations for the autonomous vehicle and for autonomously controlling a motion of the autonomous vehicle;
    operating an auxiliary control unit, coupled to a second set of vehicle sensors, separate from the first set of vehicle sensors, that monitor the environment outside the autonomous vehicle, to detect a predefined condition or event;
    receiving, by the auxiliary control unit, the trajectory data representing the planned future trajectory of the autonomous vehicle from the primary control system; and
    generating, using the auxiliary control unit, a vehicle response output based on the detected predefined condition or event, a second sensor input from the second set of vehicle sensors, and the trajectory data, wherein the vehicle response output is associated with a verification of the trajectory data based at least in part on the second sensor input.

13. The method of claim 12, further comprising:
    communicating, by the auxiliary control unit, the vehicle response output to the primary control system.

14. The method of claim 13, wherein the auxiliary control unit repeatedly communicates the vehicle response output to the primary control system while monitoring for the predefined condition or event.

15. The method of claim 13, further comprising:
    verifying the planned future trajectory based on the vehicle response output of the auxiliary control unit.

16. The method of claim 13, further comprising:
    communicating, by the auxiliary control unit, the vehicle response output to one or more control devices of the autonomous vehicle, to cause the one or more control devices to implement a vehicle action or vehicle state that is determined by the auxiliary control unit.

17. The method of claim 16, wherein the auxiliary control unit causes the one or more control devices of the autonomous vehicle to bypass the primary control system in order to perform the vehicle action determined by the auxiliary control unit.

18. A control system for an autonomous vehicle, the control system comprising:
    a primary control system to control the autonomous vehicle, including to (i) receive a first sensor input from a first set of vehicle sensors that monitor an environment outside the autonomous vehicle, (ii) determine, from the first sensor input, a state of the environment, (iii) determine, based on the state of the environment, trajectory data representing a planned future trajectory of the autonomous vehicle that comprises one or more future locations for the autonomous vehicle and is generated for autonomously controlling a motion of the autonomous vehicle, and (iv) generate, based on the trajectory data, one or more control parameters for controlling the autonomous vehicle; and
    an auxiliary control unit operating to (i) receive a second sensor input from a second set of vehicle sensors, separate from the first set of vehicle sensors, that monitor the environment outside the autonomous vehicle, (ii) receive the trajectory data representing the planned future trajectory of the autonomous vehicle from the primary control system, (iii) detect a predefined condition or event from the second sensor input, and (iv) in response to detecting the predefined condition or event, generate a vehicle response output based at least in part on the second sensor input and the trajectory data, wherein the vehicle response output is associated with a verification of the trajectory data based at least in part on the second sensor input.

19. The control system of claim 18, wherein the auxiliary control unit communicates the vehicle response output to the primary control system.

20. The control system of claim 19, wherein the primary control system uses the vehicle response output to verify the planned future trajectory of the autonomous vehicle.

* * * * *